US012028212B1

(12) United States Patent
Vaughan et al.

(10) Patent No.: US 12,028,212 B1
(45) Date of Patent: Jul. 2, 2024

(54) ENTERPRISE SERVER IMAGE (ESI) META TAGGING

(71) Applicant: Bank of America Corporation, Charlotte, NC (US)

(72) Inventors: Kerry Vaughan, Pennington, NJ (US); Aravind Singtalur, McKinney, TX (US); Manmohan V. Datla-Viswasai, Frisco, TX (US); Petar Puskarich, Plano, TX (US); Srinath Chakravarty, Plano, TX (US); Kenneth Boyd, Richmond, VA (US); Dinesh Kumar Agrawal, Rowlett, TX (US); Steven Greene, New York, NY (US); Stephen Belton, Garden City, NY (US); Elina Shkodnik, Staten Island, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/216,638

(22) Filed: Jun. 30, 2023

(51) Int. Cl.
| | |
|---|---|
| *G06F 9/44* | (2018.01) |
| *G06F 8/60* | (2018.01) |
| *G06F 8/71* | (2018.01) |
| *G06F 9/50* | (2006.01) |
| *G06F 16/182* | (2019.01) |
| *G06F 16/38* | (2019.01) |
| *G06F 21/30* | (2013.01) |
| *H04L 12/24* | (2006.01) |

(Continued)

(52) U.S. Cl.
CPC ............ *H04L 41/0866* (2013.01); *G06F 8/60* (2013.01); *G06F 8/71* (2013.01); *G06F 16/38* (2019.01)

(58) Field of Classification Search
CPC ......... H04L 41/0866; G06F 8/60; G06F 8/71; G06F 16/38
See application file for complete search history.

(56) References Cited

U.S. PATENT DOCUMENTS

| | | | | |
|---|---|---|---|---|
| 6,104,715 | A * | 8/2000 | Basso | H04Q 11/0478 370/397 |
| 7,657,887 | B2 * | 2/2010 | Kothandaraman | H04L 67/06 717/176 |

(Continued)

*Primary Examiner* — Thu V Nguyen
*Assistant Examiner* — Golam Mahmud
(74) *Attorney, Agent, or Firm* — Weiss & Arons LLP (57) ABSTRACT

A system prevents incorrect deployment of computer code in remote enterprise servers. The system includes a source code repository for housing computer code received from developers and housing software that maintains the code and develops version control information (VCI) for same. The system includes a continuous integration/continuous deployment (CICD) pipeline orchestrator and arranges deployment of the computer code by determining servers to which the code will be deployed. A metatag affixing engine and database creates metatag information corresponding to the computer code and stores the metatag information. The metatag information qualifies the code for deployment at the servers, as follows. A code management system schedules deployment. Prior to deployment, each of the servers reads the metatag implemented on the code and compares the metatag on the code to determine whether the metatag matches the metatag stored at the database. When the metatags matches at the server, the computer code is deployed.

20 Claims, 4 Drawing Sheets

(51) Int. Cl.
*H04L 29/08* (2006.01)
*H04L 41/0866* (2022.01)

(56) References Cited

U.S. PATENT DOCUMENTS

| | | | | |
|---|---|---|---|---|
| 9,032,388 | B1* | 5/2015 | Watson | G06F 21/30 |
| | | | | 717/172 |
| 9,851,986 | B2* | 12/2017 | Chen | G06F 9/45558 |
| 2002/0104071 | A1* | 8/2002 | Charisius | G06F 8/71 |
| | | | | 717/109 |
| 2011/0029967 | A1* | 2/2011 | Berg | G06F 8/61 |
| | | | | 717/178 |
| 2018/0310185 | A1* | 10/2018 | Sugatoor | H04W 16/18 |
| 2020/0177478 | A1* | 6/2020 | Dakshinyam | G06F 16/1824 |
| 2020/0233937 | A1* | 7/2020 | Fox | H04L 67/146 |
| 2021/0109797 | A1* | 4/2021 | Zhou | G06Q 20/42 |
| 2021/0234749 | A1* | 7/2021 | Vazirani | H04L 67/34 |
| 2023/0224212 | A1* | 7/2023 | Bregman | G06F 9/44505 |
| | | | | 709/220 |

* cited by examiner

ENTERPRISE SERVER IMAGE (ESI) META TAGGING

FIELD OF TECHNOLOGY

Aspects of the disclosure relate to continuous integration/continuous deployment (CICD) deployment activities.

BACKGROUND OF THE DISCLOSURE

When performing CICD activities, it is challenging for developer/operation (DevOps) teams to ensure products and components they deploy have the correct versioning.

Current deployment technologies use analogous TRAIN deployment scenarios, where devices (servers) on a YAML list within a deployment server determine if components are routed for deployment to specific servers. For the purposes of this application, TRAIN deployment scenarios should be understood to refer to a periodic or analogous process to deploy the latest version of software at relevant servers. For the purposes of this application, YAML (Yet Another Markup Language or, alternatively, YAML Ain't Markup Language) should be understood to refer to a data-serialization language commonly used for configuration files and in applications where data is being stored or transmitted.

It would be desirable to promote tagging of code to allow for more correct CICD in TRAIN deployment scenarios.

It would be yet further desirable to enable greater control of code deployment in CICD systems.

It would be still further desirable to graphically monitor deployments via tag monitoring.

It would also be desirable to enable simplified deployments of CICD.

SUMMARY OF THE DISCLOSURE

The innovations set forth herein seek to implement a logical tag on to the components. The logical tag enables DevOps (Development/Operational) teams and management applications (such as HORIZON XLR or MERLIN) to determine if a component should be deployed to servers within a pre-determined infrastructure.

The current innovation would use a network routing paradigm in conjunction with the TRAIN approach. The deployment server would survey all servers within the infrastructure and create a database of servers that have been "Tagged". If a DevOps team wants to deploy code (or alternatively one or more code components) to these servers the team preferably requires a matching tag on the code or code component the team wants deployed.

The component would also have features such as version priority which overrides current functions which typically always deploy latest code versions first.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Methods for preventing incorrect deployment of computer code in remote enterprise servers are provided. The methods may include receiving the computer code, and submitting the computer code into a code management system. The code management system may operate to schedule code deployment.

The method may also include developing version control information (VCI) for the computer code. Some embodiments may involve preparing code orchestration for implementing a logical tag onto the computer code. The logical tag may represent that the computer code qualifies for deployment at the one or more remote enterprise servers.

When the computer code qualifies for deployment, the method may then implement the logical tag on the computer code. In addition to implementing the logical tag on the computer code, the method may store the logical tag at a database.

Once the logical tag is stored at a database, the method may then transmit, preferably after the storing, the computer code for deployment at the one more remote enterprise servers. Prior to deployment at the one more remote enterprise servers, the one or more servers may be configured to read the logical tag implemented on the computer code.

Following the reading of the logical tag on the computer code, the method may compare the logical tag information to determine whether the logical tag implemented on the computer code matches the logical tag stored at the database. When the logical tag implemented at the one more remote enterprise servers matches the logical tag stored at the database, the method may include deploying the computer code at the one more remote enterprise servers.

In some embodiments, the method may throttle the deployment of the computer code by, in one embodiment, reducing the number of deployment servers to a selected portion of the one or more remote enterprise servers. In some embodiments, the logical tag may include the VCI, or some other suitable version of the VCI.

It should be noted that the comparing the logical tag implemented at the one or more remote enterprise servers may be performed using one or more digital filters located at the server. At the servers, each of the servers may act to filter the logical tag associated with the computer code to determine whether a match exists to the logical tag stored at the database. In some embodiments such filtering may involve determining whether there is a match between the VCI associated with the computer code and a VCI stored in the database that confirms that the computer code is appropriate for deployment at the server to which it is being deployed.

When the logical tag implemented at the one or more remote enterprise servers fails to match the logical tag stored at the database then the method may prevent deployment of the computer code at the one more remote enterprise servers.

When the logical tag implemented at the one more remote enterprise servers fails to match the logical tag stored at the database then the method may terminate deployment of the computer code at the one more remote enterprise servers.

In certain embodiments, the method or methods may include surveying all servers, or some portion of the servers within an infrastructure. The method may include selecting one or more remote enterprise servers from among the servers within the infrastructure.

In certain embodiments, the methods may include periodically (or, alternatively, continuously) monitoring the logical tag. This monitoring may begin at any suitable time, but most particularly when the logical tag is implemented on the computer code. This monitoring may continue until the computer code is deployed at the one or more remote enterprise servers. Thereafter, this monitoring may cease. In certain embodiments, an audit trail of the logical tag may be created in order to track the movement of the version of the code or the component code through the deployment process.

The following figures and associated written specifications set forth the invention in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
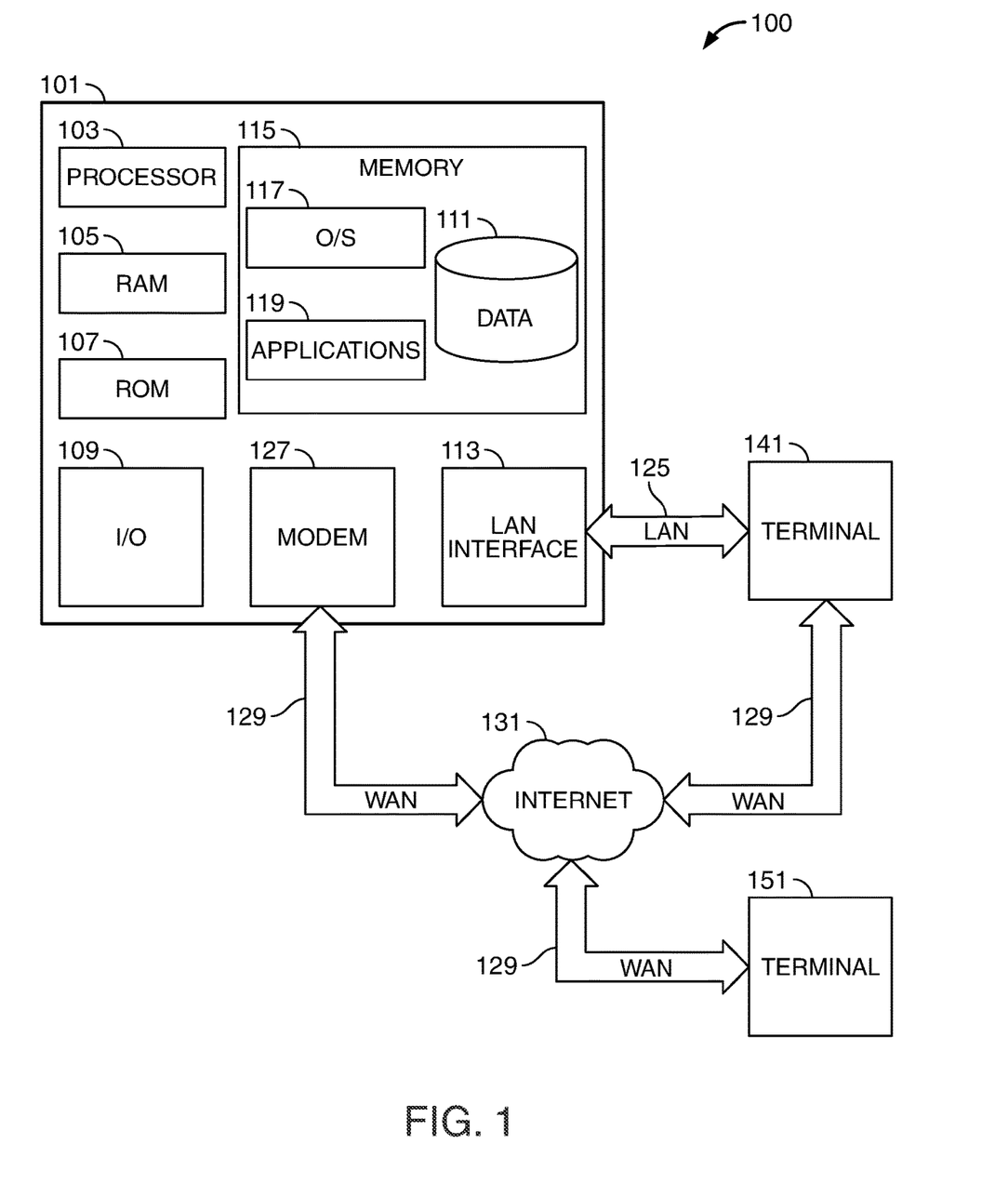
FIG. 1 shows an illustrative system in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
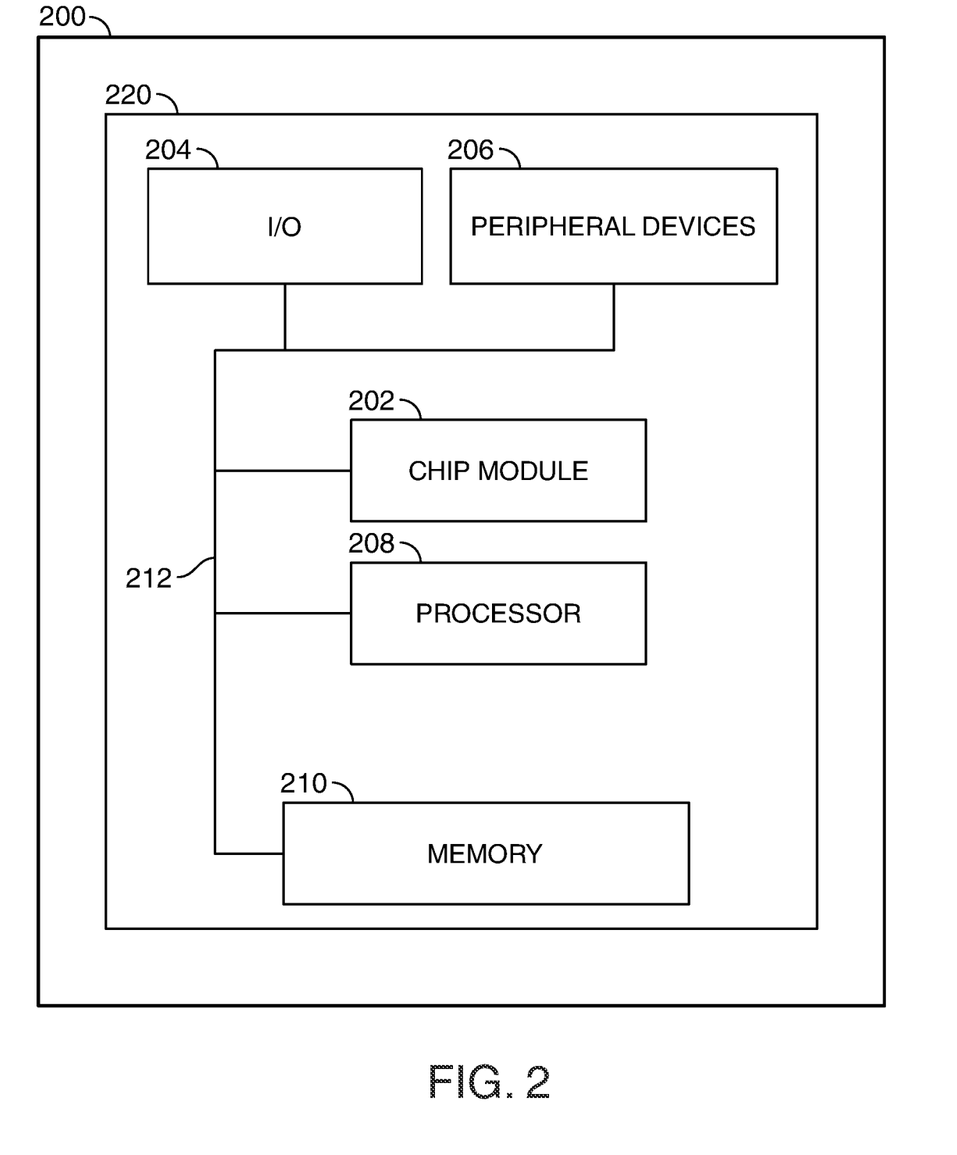
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

For the purposes of this application CICD should be understood to refer to continuous integration and continuous delivery/continuous deployment. CI is a modern software development practice in which incremental code changes are made frequently and preferably reliably. Automated build-and-test steps triggered by CI ensure that code changes being merged into a repository are reliable. The code is then delivered relatively quickly and preferably seamlessly as a part of the CD process.

In the context of computer software and hardware, the CI/CD pipeline refers to the automation that enables incremental code changes from developers' desktops to be delivered quickly and reliably to production. In the context of the current application, this refers to changes that are sent down system trains as version of software for deployment at one or more enterprise servers.

Figure 3A:
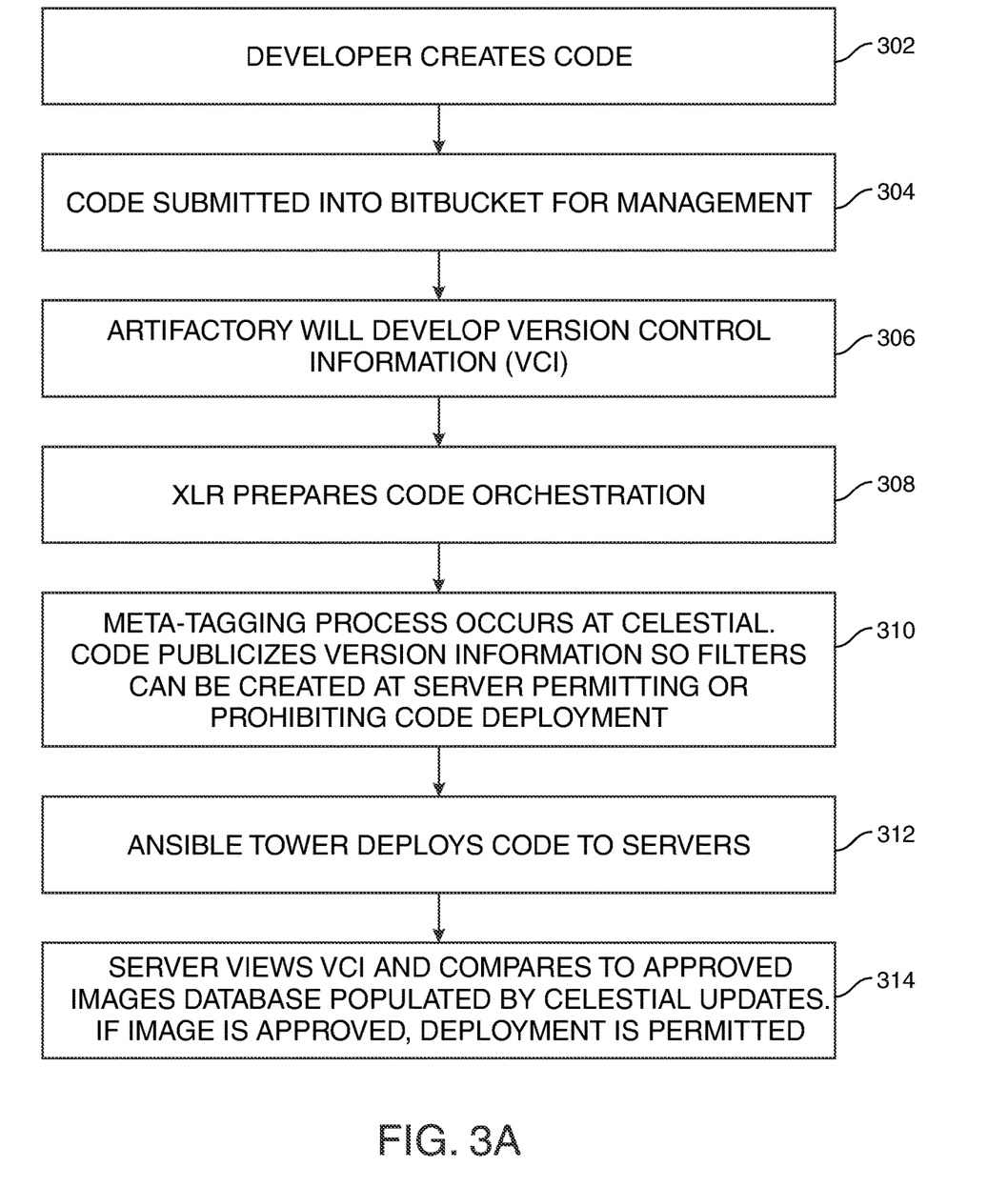
FIG. 3A shows an illustrative flow diagram in accordance with the principles of the disclosure.

FIG. 3A shows an illustrative flow diagram of a process according to the embodiments. At 302, a developer creates code or code components for use in one or more embodiments according to the disclosure.

At 304, code may be submitted into Bitbucket or other suitable cloud-based service that helps developers store and manage their code, as well as track and control the changes to their code. Also, such services provide a cloud-based Git repository hosting service.

At 306, Artifactory, or some other similar service devel-ops version control information (VCI) for the computer code, is shown. Some embodiments may involve preparing code orchestration for implementing a logical tag onto the computer code. The logical tag may represent that the computer code qualifies for deployment at the one or more remote enterprise servers.

At 308 XLR (a reference to Horizon XLR or similar service) the flow diagram shows determining if a component should be deployed to servers within a pre-determined infrastructure. This is known as code orchestration—i.e., directing the deployment of code within an infrastructure.

At 310, a meta-tagging (or, alternatively, a logical tagging process) occurs at Celestial (or other similar database with additional logical functions similar to meta-tagging) that publicizes version information so filters can be created at one or more remote servers thereby permitting or prohibiting, as the case may be, the deployment of the code or component that has been sent via the TRAIN deployment.

At 312 an Ansible Tower or other suitable deployment engine may then transmit, preferably after the storing of the meta tag at the Celestial database, the computer code or component for deployment at the one more remote enterprise servers.

At 314, the server preferably views or otherwise reads the VCI and compares the VCI to entries in an approved images database that has been populated by Celestial updates. If the image is approved, i.e. the VCI at the server matches the VCI at the stored in the approved images server with respect with the particular server in which the version is being deployed, deployment is permitted. If not, deployment may be terminated or otherwise prevented.

Figure 3B:
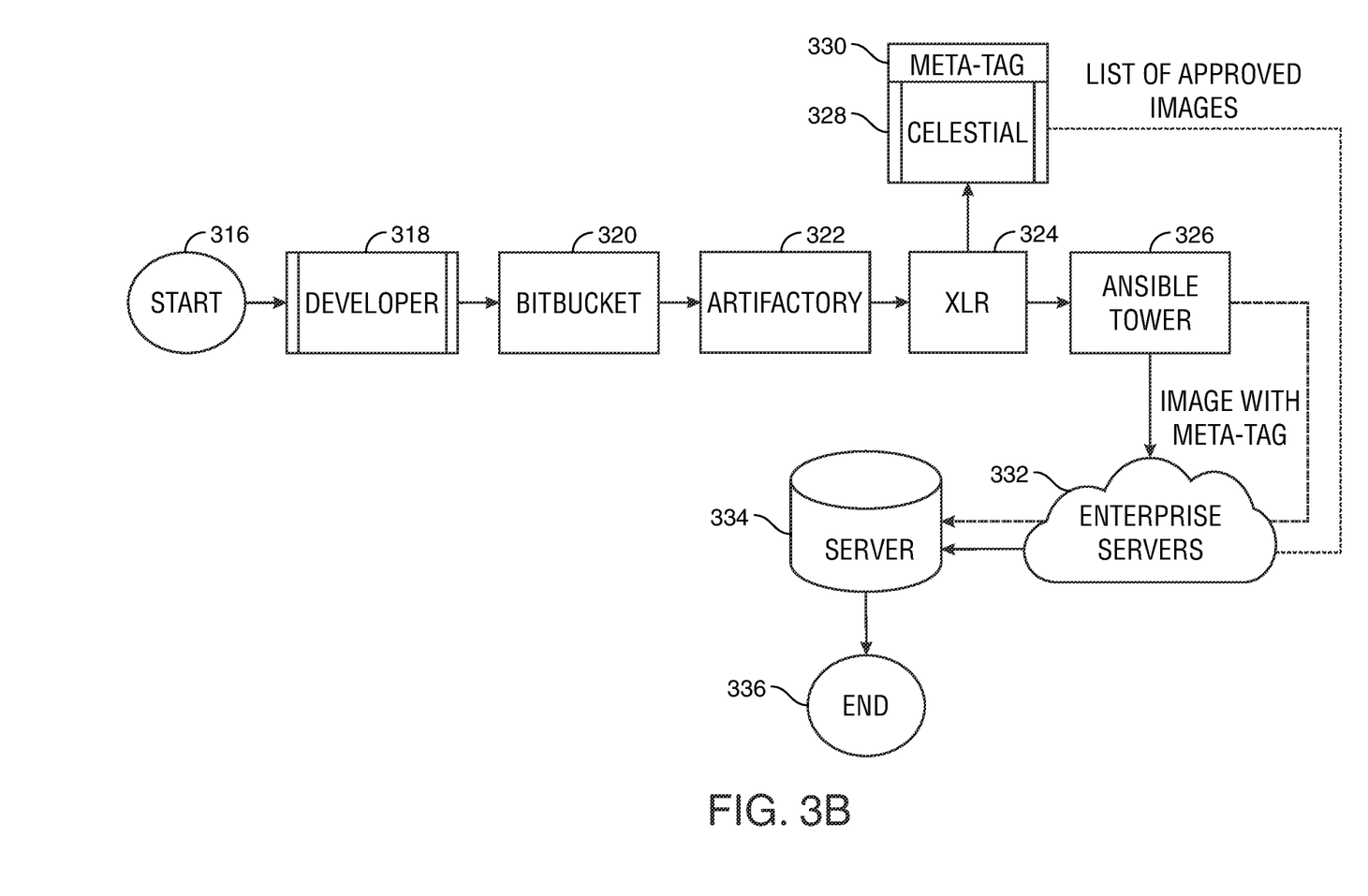
FIG. 3B shows a hybrid flow diagram which includes the architecture of a system in accordance with principles of the disclosure.

FIG. 3B shows a hybrid flow diagram which includes the architecture of a system according to certain embodiments. At 316, the start of the process is shown. At the 318, the developer develops the code or component. At 320, Bitbucket is used to store and manage the code. At 322, Artifactory is used to develop version control information (VCI) for the code. At 324, XLR determines, and maps, the deployment of target servers for the newly-received code. In one direction, XLR transmits the code to a Celestial database for affixing a meta-tag corresponding to the VCI associated with the code or component.

At Celestial, a list of approved version images is produced. The approved images are approved for particular servers. In addition, XLR transmits to the Ansible Tower 326 the code or component for deployment to the selected enterprise servers 332. Prior to deployment at the individual servers 334, the selected enterprise servers perform a comparison with the VCI on each code or component that the selected enterprise servers receive with the list of approved images stored at the Celestial database for each of the selected enterprise servers. If the VCIs match, then the code or component is deployed at each server 334 and the deployment process ends.

Thus, methods and apparatus provide Enterprise Server Image (EST) Meta Tagging. Persons skilled in the art will appreciate that the present invention can be practiced by other than the described embodiments, which are presented for purposes of illustration rather than of limitation, and that the present invention is limited only by the claims that follow.

What is claimed is:

1. A method for preventing incorrect deployment of computer code in one or more remote enterprise servers, the method comprising:
   receiving the computer code;
   submitting the computer code into a code management system, said code management system for scheduling of code deployment;
   developing version control information (VCI) for the computer code;
   preparing code orchestration for implementing a metatag onto the computer code, said metatag representing that the computer code qualifies for deployment at the one or more remote enterprise servers and, when the computer code qualifies for deployment, implementing the metatag on the computer code;
   in addition to implementing the metatag on the computer code, storing the metatag at a database;
   transmitting the computer code for deployment at the one more remote enterprise servers;
   prior to deployment at the one more remote enterprise servers, reading, at the one more remote enterprise servers, the metatag implemented on the computer code;
   comparing the metatag implemented at the one more remote enterprise servers to determine whether the metatag implemented on the computer code matches the metatag stored at the database; and
   when the metatag implemented at the one more remote enterprise servers matches the metatag stored at the database deploying the computer code at the one more remote enterprise servers.

2. The method of claim 1 further comprising limiting an ability to deploy the computer code to a selected portion of the one or more remote enterprise servers.

3. The method of claim 1 wherein the metatag comprises the VCL.

4. The method of claim 1 wherein the comparing the metatag implemented at the one more remote enterprise servers is performed using one or more digital filters located at the server, wherein the server filters the VCI associated with the computer code to determine whether there is a match exists between the VCI associated with the computer code and a VCI stored in the database.

5. The method of claim 1 wherein when the metatag implemented at the one or more remote enterprise servers fails to match the metatag stored at the database then preventing deployment of the computer code at the one more remote enterprise servers.

6. The method of claim 1 wherein when the metatag implemented at the one more remote enterprise servers fails to match the metatag stored at the database then terminating deployment of the computer code at the one more remote enterprise servers.

7. The method of claim 1 further comprising surveying all servers within an infrastructure and selecting the one or more remote enterprise servers from among the servers within the infrastructure.

8. The method of claim 1 further comprising periodically monitoring the metatag from when the metatag is implemented on the computer code until the computer code is deployed at the one or more remote enterprise servers.

9. A system for preventing incorrect deployment of computer code in one or more remote enterprise servers, the system comprising:
   a source code repository for housing the computer code upon receipt from a developer;
   housing software for maintaining the computer code and developing version control information (VCI) for the computer code;
   a continuous integration/continuous deployment (CICD) pipeline orchestrator for arranging deployment of the computer code by determining a set of enterprise servers to which the computer code will be deployed;
   a metatag affixing engine and database for creating metatag information corresponding to the computer code and storing the metatag information, said metatag information representing that the computer code qualifies for deployment at the set of enterprise servers;
   code management system for scheduling computer code deployment;
   wherein, prior to deployment of the computer code at the set of enterprise servers, each of the servers is configured to read the metatag implemented on the computer code;
   wherein each of the set of enterprise servers compares the metatag implemented on the code to determine whether the metatag implemented on the computer code matches the metatag stored at the metatag affixing engine and database; and
   wherein, when the metatag implemented on the computer code matches the metatag stored at the metatag affixing engine and database, each of the set of enterprise servers deploys the computer code at the one more remote enterprise servers.

10. The system of claim 9 wherein the computer code is limited to deployment at a selected portion of the enterprise servers.

11. The system of claim 9, the metatag further comprising the VCI.

12. The system of claim 9 further comprising a set of digital filters, each of the set of the digital filters located at one of the set of enterprise servers, wherein each server filters the VCI associated with the computer code to determine whether there is a match exists between the VCI associated with the computer code and a VCI stored in the metatag affixing engine and database.

13. The system of claim 9 wherein when the metatag implemented on the computer code fails to match the logical tag stored at the metatag affixing engine and database then the enterprise servers prevent deployment of the computer code.

14. The system of claim 9 wherein when the metatag implemented on the computer code fails to match the metatag stored at the database then the enterprise servers terminate deployment of the computer code.

15. The system of claim 9 further comprising a monitoring device for surveying all servers within an infrastructure and selecting enterprise servers from among the servers within the infrastructure for deployment of the computer code.

16. The system of claim 15 wherein the monitoring device is further configured to periodically monitor the metatag from when the metatag is implemented on the computer code until computer code is deployed at the enterprise servers.

17. A system for preventing incorrect deployment of a computer code component in one or more remote enterprise servers, the system comprising:
- a source code component repository for housing the computer code component upon receipt from a developer;
- housing software for maintaining the computer code component and developing version control information (VCI) for the computer code component;
- a continuous integration/continuous deployment (CICD) pipeline orchestrator for arranging deployment of the computer code component by determining a set of enterprise servers to which the computer code component will be deployed;
- a metatag affixing engine and database for creating metatag information corresponding to the computer code component and storing the metatag information, said metatag information representing that the computer code component qualifies for deployment at the set of enterprise servers;
- code component management system for scheduling computer code component deployment;
- wherein, prior to deployment of the computer code component at the set of enterprise servers, each of the servers is configured to read the metatag implemented on the computer code component;
- wherein each of the set of enterprise servers compares the metatag implemented on the code component to determine whether the metatag implemented on the computer code component matches the metatag stored at the metatag affixing engine and database; and
- wherein, when the metatag implemented on the computer code component matches the metatag stored at the metatag affixing engine and database, each of the set of enterprise servers deploys the computer code component at the one more remote enterprise servers.

18. The system of claim 17 wherein the computer code component is limited to deployment at a selected portion of the enterprise servers.

19. The system of claim 17, the metatag further comprising the VCI.

20. The system of claim 17 further comprising a set of digital filters, each of the set of the digital filters located at one of the set of enterprise servers, wherein each server filters the VCI associated with the computer code component to determine whether there is a match exists between the VCI associated with the computer code component and a VCI stored in the metatag affixing engine and database.

* * * * *